(12) United States Patent
Matsuzaki et al.

(10) Patent No.: US 10,474,153 B2
(45) Date of Patent: Nov. 12, 2019

(54) WORK VEHICLE, SLOPE TRAVEL CONTROL SYSTEM FOR WORK VEHICLE, AND SLOPE TRAVEL CONTROL METHOD FOR WORK VEHICLE

(71) Applicant: Kubota Corporation, Osaka-shi (JP)

(72) Inventors: Yushi Matsuzaki, Sakai (JP); Atsushi Shinkai, Sakai (JP); Keishiro Nishi, Sakai (JP)

(73) Assignee: KUBOTA CORPORATION, Osaka-Shi (JP)

( * ) Notice: Subject to any disclaimer, the term of this patent is extended or adjusted under 35 U.S.C. 154(b) by 0 days.

(21) Appl. No.: 15/385,760

(22) Filed: Dec. 20, 2016

(65) Prior Publication Data

US 2018/0024563 A1 Jan. 25, 2018

(30) Foreign Application Priority Data

Jul. 19, 2016 (JP) .................................. 2016-141291

(51) Int. Cl.
*G05D 1/02* (2006.01)
*B62D 15/02* (2006.01)
(Continued)

(52) U.S. Cl.
CPC ............ *G05D 1/0214* (2013.01); *A01B 63/11* (2013.01); *B62D 15/025* (2013.01);
(Continued)

(58) Field of Classification Search
None
See application file for complete search history.

(56) References Cited

U.S. PATENT DOCUMENTS

| 8,275,516 | B2 * | 9/2012 | Murphy | A01B 69/00 701/124 |
| 9,481,977 | B1 * | 11/2016 | Clar | E02F 3/841 |
| 2004/0158355 | A1 * | 8/2004 | Holmqvist | G05D 1/0236 700/245 |
| 2008/0208416 | A1 * | 8/2008 | Yuet | B60T 7/12 701/50 |
| 2011/0022267 | A1 * | 1/2011 | Murphy | A01B 69/00 701/38 |

(Continued)

FOREIGN PATENT DOCUMENTS

| EP | 2798420 B1 | 11/2014 |
| JP | 11-332329 | 12/1999 |

(Continued)

OTHER PUBLICATIONS

Extended European Search Report for corresponding EP Application No. 16002640.7-1656, dated Nov. 8, 2017.

*Primary Examiner* — Tyler J Lee
*Assistant Examiner* — Garrett F Evans
(74) *Attorney, Agent, or Firm* — Mori & Ward, LLP (57) ABSTRACT

A work vehicle to travel along a travel route includes a vehicle body, an inclination sensor, a calculator, an information generator, and a recorder. The inclination sensor is provided on the vehicle body to detect a vehicle body inclination angle with respect to a horizontal line. The calculator is to calculate a position of the work vehicle in a work field based on positioning data. The information generator is to output travel limit information at an inclination position on the travel route where the vehicle body inclination angle detected by the inclination sensor exceeds a threshold angle. The recorder is to record, as an inclined area, an area around the inclination position which is calculated based on the positioning data.

22 Claims, 4 Drawing Sheets

(51) Int. Cl.
    *G01C 9/02*     (2006.01)
    *G01C 21/34*     (2006.01)
    *G01C 21/36*     (2006.01)
    *A01B 63/11*     (2006.01)
    *A01B 69/00*     (2006.01)
    *A01B 79/00*     (2006.01)

(52) U.S. Cl.
    CPC ............. *B62D 15/029* (2013.01); *G01C 9/02* (2013.01); *G01C 21/3461* (2013.01); *G01C 21/3697* (2013.01); *A01B 69/00* (2013.01); *A01B 79/005* (2013.01); *B60Y 2200/221* (2013.01); *B60Y 2400/301* (2013.01)

(56) References Cited

U.S. PATENT DOCUMENTS

| | | | | |
|---|---|---|---|---|
| 2012/0022790 | A1* | 1/2012 | Yuan | G01C 21/00 |
| | | | | 702/5 |
| 2012/0179322 | A1* | 7/2012 | Hennessy | G05D 1/0278 |
| | | | | 701/25 |
| 2016/0090700 | A1* | 3/2016 | Tanaka | E02F 3/841 |
| | | | | 701/532 |
| 2017/0168501 | A1* | 6/2017 | Ogura | G05D 1/0278 |

FOREIGN PATENT DOCUMENTS

| | | |
|---|---|---|
| JP | 2005-215742 | 8/2005 |
| JP | 2014-064527 | 4/2014 |
| JP | 2015-189439 | 11/2015 |

* cited by examiner

| TRAVEL POINT | TRAVEL COORDINATE | VEHICLE BODY INCLINATION ANGLE | STRAIGHT TRAVEL ROUTE | TRAVEL LIMIT INFORMATION |
|---|---|---|---|---|
| $P_1$ | $(x_1, y_1)$ | $\theta_1$ | $L_1$ | – |
| $P_2$ | $(x_2, y_2)$ | $\theta_2$ | $L_1$ | – |
| ⋮ | ⋮ | ⋮ | ⋮ | ⋮ |
| $P_{20}$ | $(x_{20}, y_{20})$ | $\theta_{20}$ | $L_3$ | AUTOMATIC STEERING TRAVEL PROHIBITION |
| ⋮ | ⋮ | ⋮ | ⋮ | ⋮ |
| $P_{25}$ | $(x_{25}, y_{25})$ | $\theta_{25}$ | $L_3$ | AUTOMATIC STEERING TRAVEL PROHIBITION |
| ⋮ | ⋮ | ⋮ | ⋮ | ⋮ |

WORK VEHICLE, SLOPE TRAVEL CONTROL SYSTEM FOR WORK VEHICLE, AND SLOPE TRAVEL CONTROL METHOD FOR WORK VEHICLE

CROSS-REFERENCE TO RELATED APPLICATIONS

The present application claims priority under 35 U.S.C. § 119 to Japanese Patent Application No. 2016-141291, filed Jul. 19, 2016. The contents of this application are incorporated herein by reference in their entirety.

BACKGROUND OF THE INVENTION

Field of the Invention

The present invention relates to a work vehicle, and a slope travel control system for a work vehicle, and a slope travel control method for a work vehicle.

Discussion of the Background

Paddy work vehicles could easily become unstable in orientation when climbing across a ridge after work is finished to head toward a next work field. Japanese Patent Application Laid-open No. H11-332329 discloses a paddy work vehicle that includes a detector configured to detect left and right inclination angles of a travelling machine body. The paddy work vehicle has a function of activating a warning device in accordance with a result of detection of an angle equal to or above an angle set in the detector, and a function of stopping a travelling machine body by disengaging a main clutch of the travelling machine body.

Japanese Patent Application Laid-open No. 2005-215742 discloses a riding control machine capable of travelling in an autonomous manner. The riding control machine includes an inclination angle detector configured to detect inclination angles in front, rear, left, and right directions of a machine body. The riding control machine has a function of changing an autonomous travelling speed or stopping the machine body, in accordance with a detected inclination angle. These features can enhance safety by reducing a travelling speed or stopping the machine body to prevent the machine body from being inclined excessively if the riding control machine gets caught in soft ground or mud in a work field, or if a wheel runs on to an obstruction, a ridge, a rut, or similar uneven ground.

Japanese Patent Application Laid-open No. 2014-064527 discloses a paddy work vehicle capable of selecting either a method with which a driver gets off from a driving compartment to allow the paddy work vehicle to travel at a low speed in an autonomous manner when travelling across a ridge to enter into or exit from a paddy field (ridge travelling operation), or loading or unloading the paddy work vehicle into or from a truck (unseated operation), or a method with which the paddy work vehicle is kept travelled while the driver is remain seated (seated operation). This paddy work vehicle can issue a warning if an inclination value of a main vehicle body detected by an inclination sensor exceeds a set value. The driver is thus able to know a precise degree of an inclination of an inclined area upon the warning is received and to appropriately determine whether an operation should be switched from the seated operation to the unseated operation.

Japanese Patent Application Laid-open No. 2015-189439 discloses an agricultural work vehicle including an inclination sensor that measures an inclination angle with respect to a horizontal direction of a traveling machine body, and a panel for displaying a result of detection performed by the inclination sensor. The inclination angle includes a pitch angle of an inclination in front and rear directions of the travelling machine body, and a roll angle of an inclination in left and right directions of the travelling machine body. The panel includes a pitch angle display and a roll angle display for respectively displaying the pitch angle and the roll angle. A warning is issued if at least either the pitch angle or the roll angle exceeds a predetermined value.

SUMMARY

According to one aspect of the present invention, a work vehicle to travel along a travel route includes a vehicle body, an inclination sensor, a calculator, an information generator, and a recorder. The inclination sensor is provided on the vehicle body to detect a vehicle body inclination angle with respect to a horizontal line. The calculator is to calculate a position of the work vehicle in a work field based on positioning data. The information generator is to output travel limit information at an inclination position on the travel route where the vehicle body inclination angle detected by the inclination sensor exceeds a threshold angle. The recorder is to record, as an inclined area, an area around the inclination position which is calculated based on the positioning data.

According to another aspect of the present invention, a work vehicle to travel along a travel route includes a vehicle body, an inclination sensor, a calculator, an information generator, and a recorder. The inclination sensor is provided on the vehicle body to detect a vehicle body inclination angle with respect to a horizontal line. The calculator is to calculate a position of the work vehicle in a work field based on positioning data. The information generator is to output travel limit information at an inclination position on the travel route where the vehicle body inclination angle detected by the inclination sensor exceeds a threshold angle. The recorder is to record, as an inclined area, an area around the inclination position which is calculated based on the positioning data.

According to further aspect of the present invention, a slope travel control method for a work vehicle to travel along a travel route in a work field, includes detecting a vehicle body inclination angle of a vehicle body of the work vehicle with respect to a horizontal line. A position of the work vehicle in the work field is calculated based on positioning data. The vehicle body inclination angle associated with the position is received. Travel limit information is outputted at an inclination position on the travel route where the vehicle body inclination angle exceeds a threshold angle. An area around the inclination position which is calculated based on the positioning data is recorded as an inclined area.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF EMBODIMENTS

The embodiments will now be described with reference to the accompanying drawings, wherein like reference numerals designate corresponding or identical elements throughout the various drawings.

Figure 1:
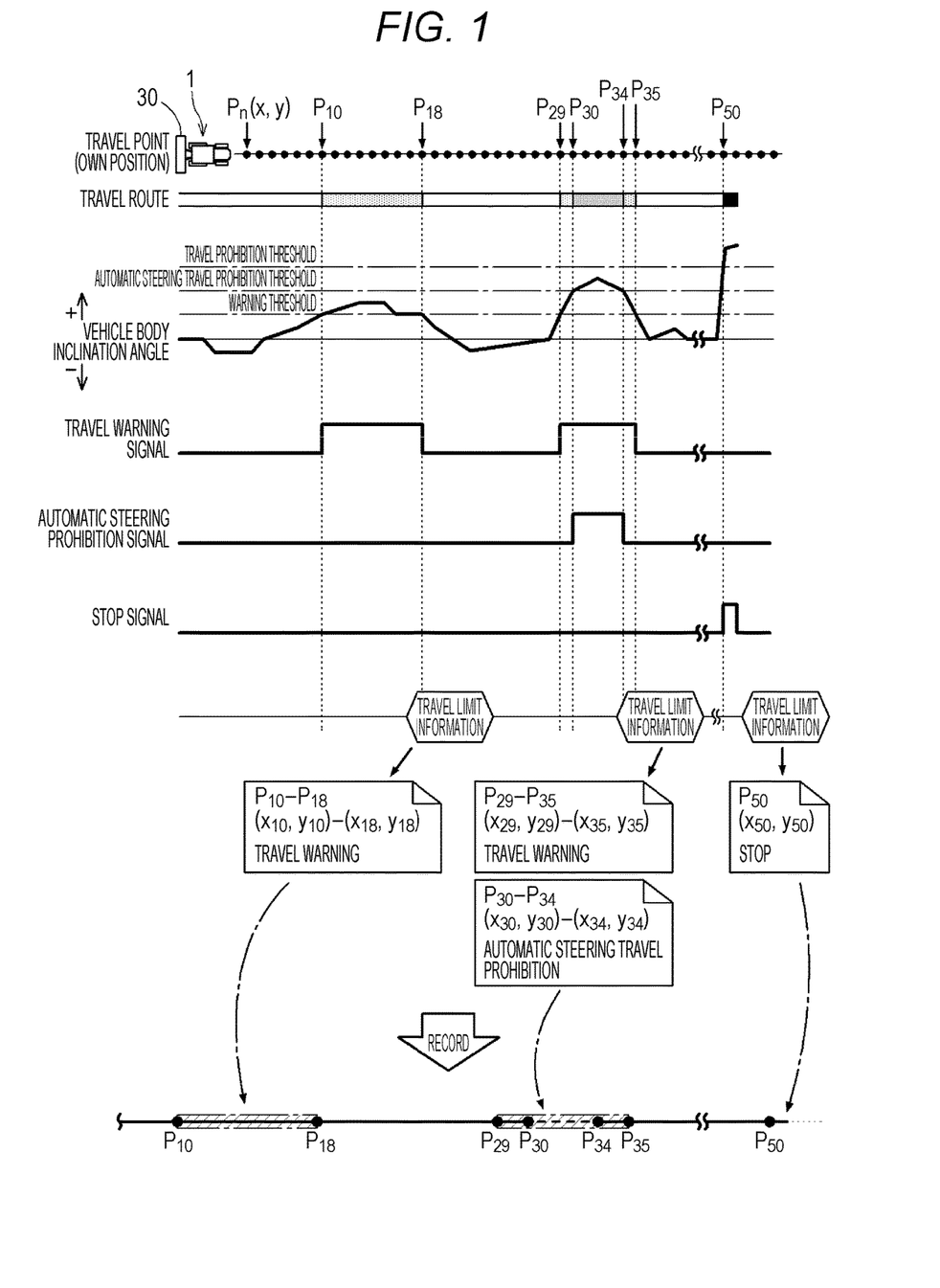
FIG. 1 is a view illustrating basics of slope travel control in working and travelling in a work field.

Prior to describing a work vehicle according to a specific exemplary embodiment of the present invention, basics of slope travel control in working and travelling in a work field will now be described herein with reference to FIG. 1. FIG. 1 illustrates a schematic work vehicle including a vehicle body 1 and a work device 30 mounted on the vehicle body 1. This work vehicle has a function of detecting a vehicle body inclination angle, and a function of calculating, using, for example, a GNSS module, a coordinate position indicating a travel position of the vehicle body 1 being travelling (hereinafter simply referred to as an own position). A straight line in FIG. 1 shows a travel route along which the work vehicle should travel and which is planned beforehand based on a work plan. However, an actual travel route includes many straight travel routes and curved travel routes (180° turn and 90° turn) joining the adjacent straight travel routes. Reference signs Pn (n: a suffix) in FIG. 1 represent travel points identifying own positions on the travel route. The travel points are each added with a map coordinate position (x, y).

This work vehicle also has an automatic steering function for unmanned travel or no-driver travel with automatic steering, and a manual steering function for manned travel with manual steering, thereby selecting either an automatic travel (automatic steering) mode or a manual travel (manual steering) mode. Also, a plurality of work vehicles can be used in a single work field to form a work and travel style where some of the plurality of work vehicles are steered and travelled manually, while the remaining work vehicles are steered and travelled automatically.

Travel limit information having different contents depending on a vehicle body inclination angle detected while working and travelling is output. Three thresholds are set in the work vehicle, which have a size relationship of a warning threshold<an automatic steering travel prohibition threshold<a travel prohibition threshold. The warning threshold is a threshold for triggering a warning notification to the supervisor supervising the work vehicle being steered and travelled in the automatic travel (automatic steering) mode, and for outputting a travel warning signal as the travel limit information. The automatic steering travel prohibition threshold is a threshold for triggering a stoppage of the vehicle body being operated with automatic steering, and for outputting an automatic steering prohibition signal as the travel limit information. The travel prohibition threshold is a threshold for triggering an emergency stoppage of the vehicle body regardless of whether the work vehicle is operated with either automatic steering or manual steering, and for outputting a stoppage signal as the travel limit information. These three thresholds and the vehicle body control for triggering the three thresholds are merely an example. Thresholds to be set may be reduced or increased in number. Such control may also be executed in common to automatic steering and manual steering without using control for automatic steering and control for manual steering separately. A control method may also be adopted, where a threshold is lowered, depending on a vehicle speed.

An example shown in FIG. 1 illustrates inclined areas in three levels as low, medium, and high in the travel route. In a work and travel operation shown in FIG. 1, first, a vehicle body inclination angle exceeding the warning threshold is detected at an own position of P10. Along with this detection, travel limit information regarding a travel warning signal is output. At that time, when the work vehicle is travelling with automatic steering, a travel warning is notified. In response to this warning, the supervisor supervising automatic steering closely observes a travel state of the work vehicle. As required, the supervisor lowers a vehicle speed or switches the work device 30 to a disengage state to attempt stabilization of the work vehicle by reducing a travel load. When the work vehicle reaches an own position of P18, a vehicle body inclination angle lowers equal to or below the warning threshold. Thus, an output of the travel limit information stops, and the travel warning is cancelled. A part of the travel route, which is included in a travel locus starting from the travel point of P10, i.e., an own position to the travel point of P18, i.e., another own position, and its peripheral area are recorded as an inclined area (travel-warned inclined area). Irrespective of threshold evaluations, vehicle body inclination angles may be recorded together with own positions at predetermined intervals.

Next, when the work vehicle reaches a travel point of P29, the vehicle body inclination angle exceeds the warning threshold. When the work vehicle reaches a travel point of P30, the vehicle body inclination angle exceeds the automatic steering travel prohibition threshold. Since this work vehicle is steered automatically, a travel warning is notified at the travel point of P29, and the vehicle body being steered automatically comes to a halt at the travel point of P30. After a driver seats on the work vehicle to resume working and travelling with the manual travel (manual steering) mode, and, at a travel point of P34, when the vehicle body inclination angle lowers equal to or below the automatic steering travel prohibition threshold, or, at a travel point of P35, when the vehicle body inclination angle lowers equal to or below the warning threshold, the work vehicle can switch to the automatic travel (automatic steering) mode. Also at this point, a part of the travel route included in a travel locus, which starts from the travel point of P29 to the travel point of P35, and its peripheral area are recorded as an inclined area. In particular, a part of the travel route, which starts from the travel point of P30 to the travel point of P34, is recorded as an inclined area at where the work vehicle is prohibited to travel in the automatic travel (automatic steering) mode. It is desirable that the peripheral area at this point is a width of the vehicle body+α (settable as desired) based on a center of the vehicle body 1. However, the peripheral area may substantially be zero to handle the inclined area in the form of a travel locus line.

Although a travel warning is of course notified in a range between the travel point of P30 and the travel point of P34 since the vehicle body inclination angle exceeds the warning threshold, a warning message and a warning sound can be notified in a distinguishable manner in order to distinguish a travel warning state and an automatic steering and travelling prohibited state.

Further, as a special example, the vehicle body comes to an emergency halt when the vehicle body inclination angle exceeds the travel prohibition threshold at a travel point of P50. To recover from such an emergency halt state, this inclined area is avoided by once canceling this slope travel control program, and then allowing the work vehicle to move backward or to make a turn. Even though inclined areas where travelling is prohibited are present locally, a work and travel operation can be continued by detouring the areas. A part of the travel route including the travel point of P50, and its peripheral area are also recorded at this point as an inclined area, are read in planning a next operation, and are taken into account in generating a travel route for the plan. A route for detouring such an inclined area can also be generated and recorded beforehand.

Figure 2:
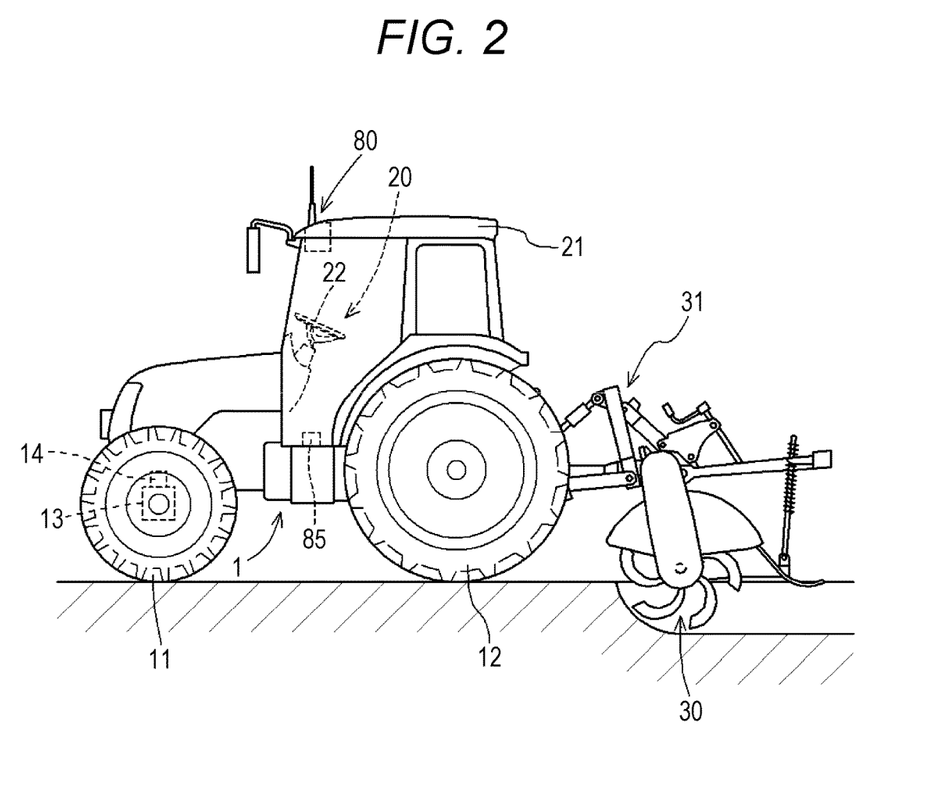
FIG. 2 is a side view of a tractor, an exemplary embodiment of a work vehicle.

Next, with reference to the drawings, a work vehicle and a slope travel control system for the work vehicle, according to a specific exemplary embodiment of the present invention will now be described herein. In this exemplary embodiment, as shown in FIG. 2, the work vehicle is a tractor that travels and works in a field (work field) separated by ridges as boundaries. This tractor is provided with an operation unit 20 at the center of the vehicle body 1 supported by front wheels 11 and rear wheels 12. At a rear of the vehicle body 1, a work device 30 that is a rotary tilling machine is mounted via a hydraulic lifting mechanism 31. The front wheels 11 function as steering control wheels through which the tractor changes a travel direction when a steering angle of the steering control wheels is changed. The steering angle of the front wheels 11 is changed by an operation of a steering mechanism 13. The steering mechanism 13 includes a steering motor 14 for automatic steering. For manual travelling, the front wheels 11 can be steered by operating a steering wheel 22 disposed on the operation unit 20. In a cabin 21 of the tractor, a satellite positioning module 80 configured as a GNSS module is provided. As a component of the satellite positioning module 80, a satellite antenna for receiving GPS signals and GNSS signals is attached at a ceiling area of the cabin 21. The satellite positioning module 80 may include an inertial navigation module incorporated with a gyro acceleration sensor and a magnetic director sensor for complementing satellite navigation. The inertial navigation module may also be provided in a different location from the location of the satellite positioning module 80.

An inclination detector 85 (an inclination sensor 85) for detecting an inclination of the vehicle body is further provided on a frame constituting the vehicle body 1. The inclination detector 85 according to this exemplary embodiment includes an angle sensor that detects an inclination angle (pitch angle) in front and rear directions of the machine body (forward and backward directions) and an inclination angle (roll angle) in a transverse direction of the machine body (left and right directions). As an inclination detection sensor, a sensor based on a type of an electrostatic capacitance, liquid surface sensor that detects a change in liquid surface due to an inclination as a change in electrostatic capacitance, a weight type sensor, or a gyro sensor may be used.

Figure 3:
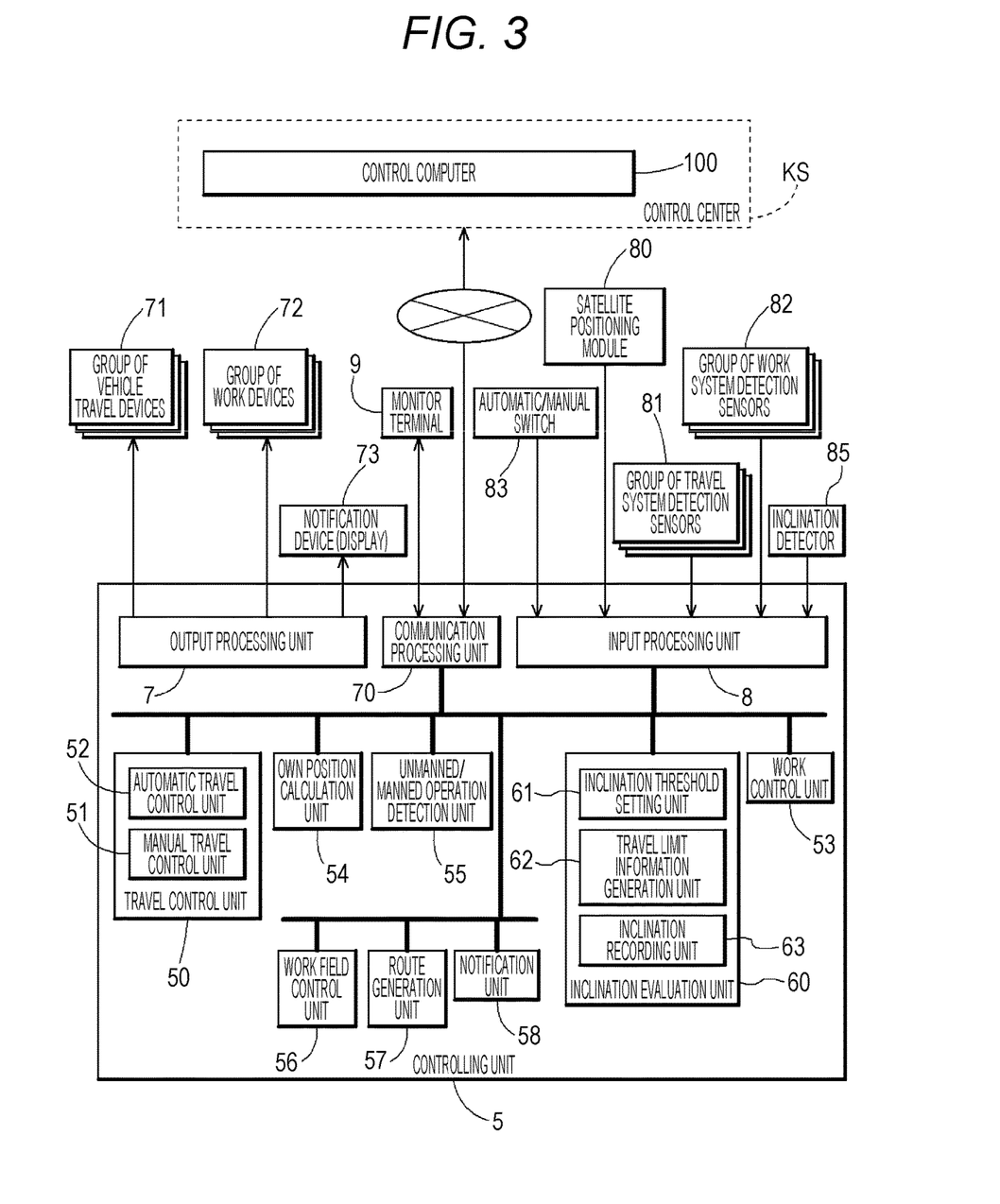
FIG. 3 is a functional block diagram illustrating a control system of the tractor.

FIG. 3 illustrates a control system configured in this tractor. This control system is configured as a system, as described with reference to FIG. 1, for achieving the slope travel control that operates based on a vehicle body inclination angle. A controlling unit 5 (circuitry 5) that is a core element of this control system includes an output processing unit 7 and an input processing unit 8 (a receiver 8), which respectively function as input and output interfaces, and a communication processing unit 70. The output processing unit 7 is connected with, for example, a group of vehicle travel devices 71, a group of work devices 72, and a notification device 73. The group of vehicle travel devices 71 includes the steering motor 14, and, although not shown in the drawings, devices to be controlled for allowing the work vehicle to travel, such as a transmission mechanism and an engine unit. The group of work devices 72 includes, for example, a drive mechanism for the work device 30, and a lifting mechanism 31 for raising and lowering the work device 30. The notification device 73 includes a display, a lamp, and a speaker, and is used to warn the driver and the supervisor of a state of the vehicle body inclined more than an allowable value. Signals are transmitted between the notification device 73 and the output processing unit 7 in a wired or wireless manner.

The communication processing unit 70 exchanges data with an external computer in conformity to a wireless communication standard and a wired communication standard. FIG. 3 shows a control computer 100 configured as an external computer in a control center KS in a remote location, and a monitor terminal 9 for monitoring the work vehicle being unmanned operated.

The input processing unit 8 is coupled to, for example, the satellite positioning module 80, a group of travel system detection sensors 81, a group of work system detection sensors 82, an automatic/manual switch 83, and the inclination detector 85. The group of travel system detection sensors 81 includes sensors for detecting travel states such as an engine speed and a transmission state. The group of work system detection sensors 82 includes, for example, sensors for detecting a ground clearance and an inclination of the work device 30, and sensors for detecting workloads and the like. The automatic/manual switch 83 is a switch for selecting either the automatic travel (automatic steering) mode for travelling with automatic steering or the manual travel (manual steering) mode for travelling with manual steering. For example, operating the automatic/manual switch 83 while the work vehicle is travelling with the automatic travel (automatic steering) mode causes the work vehicle to switch to travelling with manual steering. Moreover, operating the automatic/manual switch 83 while the work vehicle is travelling with manual steering causes the work vehicle to switch to travelling with automatic steering.

In the controlling unit 5, an inclination evaluation unit 60 that is a core function unit of the slope travel control described with reference to FIG. 1 is constructed. The controlling unit 5 also includes a travel control unit 50, a work control unit 53, an own position calculation unit 54 (a calculator 54), an unmanned/maimed operation detection unit 55, a work field control unit 56, a route generation unit 57, and a notification unit 58 (an information generator 58).

Since the automatic travel (automatic steering) mode and the manual travel (manual steering) mode are both configured to be available in this tractor for travelling, the travel control unit 50 for controlling the group of vehicle travel devices 71 includes a manual travel control unit 51 and an automatic travel control unit 52. In accordance with operations of the driver, the manual travel control unit 51 controls the group of vehicle travel devices 71. Based on a deviation between an own position and a travel route, the automatic travel control unit 52 generates and outputs an automatic steering instruction to the steering motor 14 via the output processing unit 7. To control movement of the work device 30, the work control unit 53 provides control signals to the group of work devices 72.

Based on the positioning data sent from the satellite positioning module 80, the own position calculation unit 54 calculates an own position. The notification unit 58 generates a notification signal (display data or voice data) for notifying a warning to the driver and the supervisor through the notification device 73 including the display and the speaker.

The unmanned/manned operation detection unit 55 determines whether the work vehicle is unmanned operated (no-driver operated) or manned operated, based on a state signal sent from the automatic/manual switch 83. A determination as to whether the driver is seated on a driver's seat can also be made based on a state signal sent from a seat switch included in the group of travel system detection sensors 81.

The work field control unit 56 controls field information (work field information) that is information regarding the field in which the work vehicle works and travels. The field information includes data such as a map position, shape, and size of a field, as well as plant varieties. The field information can be downloaded from the control computer 100 disposed in the control center KS in the remote location or a farmer's home, or a portable communication computer held by the driver.

Based on the field information, the route generation unit 57 reads external shape data of the field, and generates a travel route that fits to this field. This travel route may be generated automatically based on basic, initial parameters entered by an operator, or based on input parameters substantially defining a travel route entered by the operator. A configuration may be adopted, through which a travel route itself is downloaded from the control computer 100. In any case, the travel route obtained from the route generation unit 57 is developed in a memory, and used by the work vehicle to travel along the travel route regardless of whether the work vehicle is operated in either the automatic travel (automatic steering) mode or the manual travel (manual steering) mode.

To output travel limit information when a vehicle body inclination angle detected by the inclination detector 85 exceeds a predetermined angle value (a threshold angle), the inclination evaluation unit 60 includes an inclination threshold setting unit 61, a travel limit information generation unit 62, and an inclination recording unit 63 (a recorder 63). The inclination threshold setting unit 61 sets a vehicle body inclination angle as a condition for outputting travel limit information. In this exemplary embodiment, similar to the example shown in FIG. 1, the inclination threshold setting unit 61 sets a warning threshold, an automatic steering travel prohibition threshold, and a travel prohibition threshold. The thresholds have a size relationship of the warning threshold<the automatic steering travel prohibition threshold<the travel prohibition threshold.

The travel limit information generation unit 62 compares a detected vehicle body inclination angle with each of the thresholds, and outputs travel limit information as shown below.

(1) When the vehicle body inclination angle exceeds the warning threshold, the travel limit information generation unit 62 requests the notification unit 58 to output a travel warning signal that warns of travelling with automatic steering.

(2) When the vehicle body inclination angle exceeds the automatic steering travel prohibition threshold, the travel limit information generation unit 62 requests the travel control unit 50 to output an automatic steering prohibition signal for causing the vehicle body 1 being operated with automatic steering to stop.

(3) When the vehicle body inclination angle exceeds the travel prohibition threshold, the travel limit information generation unit 62 requests the travel control unit 50 to output a stop signal that causes the vehicle body 1 to stop.

While any one of the above described kinds of travel limit information (1), (2), and (3) is output, the inclination recording unit 63 receives an own position calculated by the own position calculation unit 54, and connects and records contents of the travel limit information and an inclined area that is an area of a travel route, from which the travel limit information is output. Data recorded in the inclination recording unit 63 is sent to an external computer, such as the control computer 100, via the communication processing unit 70.

Figure 4:
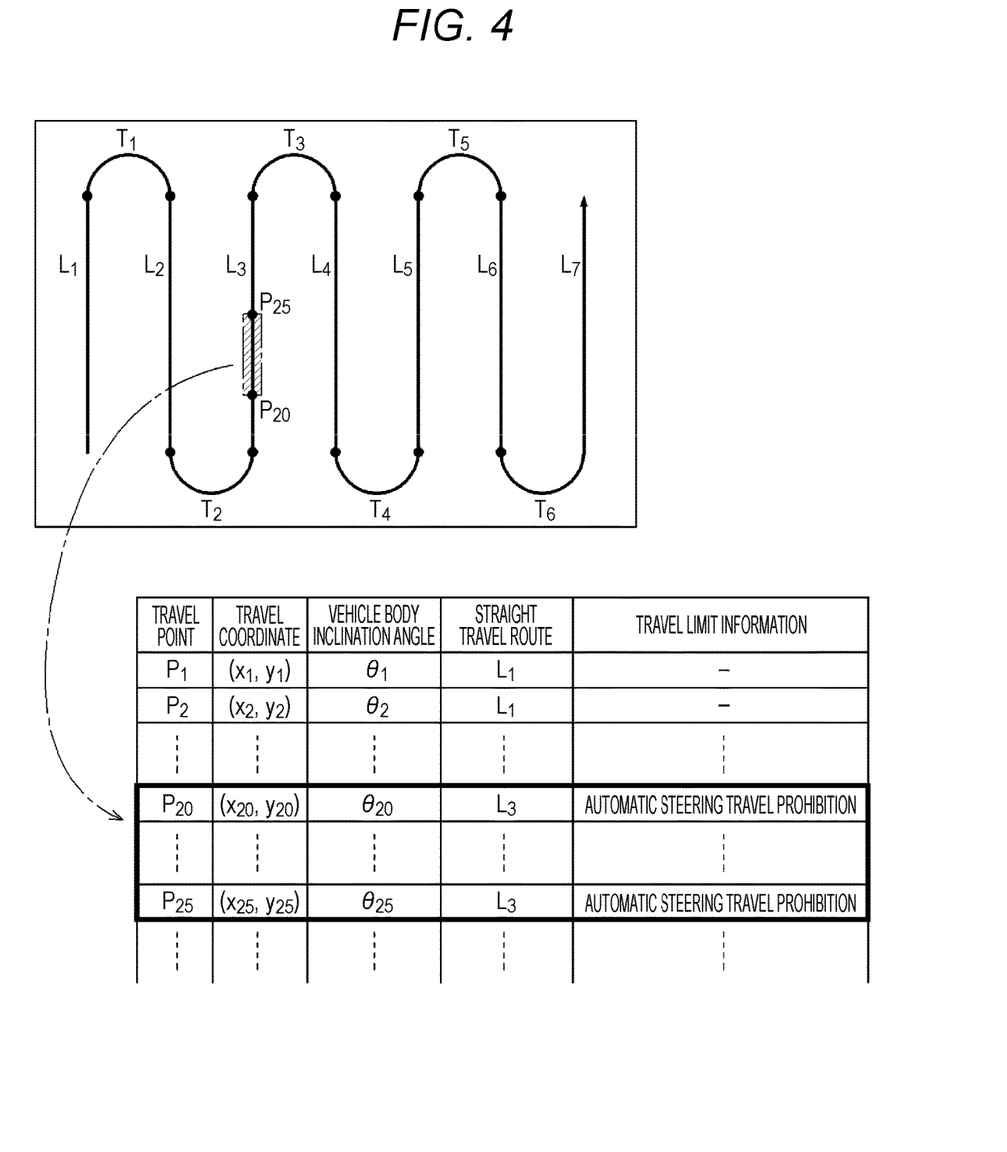
FIG. 4 is a view illustrating an example recording form in an inclination recording unit.

FIG. 4 schematically illustrates an example of a record in the inclination recording unit 63. This example shows Pn as a travel point identified by an own position in a travel route, (Xn, Yn) as a map coordinate position of a travel point, θn as a vehicle body inclination angle at each travel point, and Ln and Tn as parts of the travel route (travel route segments), to which each travel point belongs. In this example, "n" is a suffix for identification, and is a natural number starting from 1. In FIG. 4, the travel route is configured by many straight travel routes (straight travel route segments) extending in parallel each other and curved travel routes (curved travel route segments) joining the adjacent straight travel routes, where the straight travel routes are indicated with Ln, and the curved travel routes are indicated with Tn. As is apparent from FIG. 4, in this travel example, a vehicle body inclination angle prohibiting the work vehicle from being operated in the automatic travel (automatic steering) mode is detected in a range from a travel point of P20 to a travel point of P25. Thus, a part of the travel route ranging from the travel point of P20 to the travel point of P25 is regarded as an inclined area. The inclined area belongs to a straight travel route of L3. Therefore, based on the data recorded in the inclination recording unit 63, the straight travel route of L3 is handled, when a travel route is generated in planning a next operation, as a route where the work vehicle is prohibited from being operated in the automatic travel (automatic steering) mode.

The monitor terminal 9 is equipped with a display configured by a flat panel, and a buzzer. The monitor terminal 9 can receive, via the communication processing unit 70, vehicle body inclination angle data generated as data by the input processing unit 8 based on a vehicle body inclination angle detected by the inclination detector 85, and travel limit information to be output from the inclination evaluation unit 60. As the vehicle body inclination angle data includes a roll angle and a pitch angle, a graphic screen of each inclination state is shown on the display. The monitor terminal 9 also has a function of showing on the display a travel route including an own position. When the travel route information is received, a corresponding message is forcibly shown on the display, and a warning sounds from the buzzer. This can draw attention of the supervisor to know that the work vehicle is travelling on a slope.

Other Exemplary Embodiments (1) Although a plurality of thresholds are set as conditions regarding an inclination of the vehicle body for outputting travel limit information in the above described exemplary embodiments, only a single threshold may be used for simplified control. Such control may also be executed in common to automatic steering and manual steering without using control for automatic steering and control for manual steering separately.

(2) Although an inclined angle (pitch angle) in front and rear directions of the machine body (forward and backward directions) and an inclination angle (roll angle) in a transverse direction of the machine body (left and right directions) are commonly handled as inclination angles of the machine body in the above described exemplary embodiments, the inclination angles may be controlled separately based on respective separate thresholds. A configuration where only either a pitch angle or a roll angle is handled may also be adopted.

(3) Although the work vehicle is configured to be selectable between automatic steering and manual steering in the above described exemplary embodiments, the work vehicle may adopt either manual steering or automatic steering only.

(4) Each function unit in the functional block diagram shown in FIG. 3 is separated for description purposes. In an actual case, each function unit can be integrated with other function units, or divided into a plurality of sub-function units. For example, at least a part of the inclination evaluation unit 60 may be configured in a mobile phone or a tablet computer that can exchange data with the controlling unit 5 of the work vehicle.

(5) The above described exemplary embodiments have appointed, as the work vehicle, a tractor equipped with a rotary tilling machine as the work device 30. However, in addition to such a tractor, various work vehicles may be adopted as exemplary embodiments, such as agricultural vehicles including rice transplanters, fertilizer distributors, combines, and construction vehicles equipped with a dozer or a roller as the work device 30.

Industrial Applicability

The embodiments of the present invention are applicable to a work vehicle for working and travelling in a work field along a set travel route.

According to one aspect of the present invention, a work vehicle to travel along a travel route includes a vehicle body, an inclination sensor, and circuitry. The inclination sensor is provided on the vehicle body to detect a vehicle body inclination angle with respect to a horizontal line. The circuitry is configured to calculate a position of the work vehicle in a work field based on positioning data. The circuitry is configured to output travel limit information at an inclination position on the travel route where the vehicle body inclination angle detected by the inclination sensor exceeds a threshold angle. The circuitry is configured to record, as an inclined area, an area around the inclination position which is calculated based on the positioning data.

According to this configuration, when a vehicle body inclination angle equal to or above a predetermined angle is detected while travelling, travel limit information for providing any limit for travelling is output. Once the travel limit information is output, an area around a travel route, which is determined based on an own position at that time, is recorded as an inclined area. This record allows a skilled operator to know through the inclination recording unit the inclined area on the travel route where the vehicle body inclination angle equal to or above the predetermined angle is detected. Thus, even if the inclined area is remained un-operated, a measure can be taken, such as allowing the skilled operator to drive the work vehicle for working and travelling, or an operator to drive a special work vehicle for working and travelling.

Travel limits to be executed based on travel limit information when the travel limit information is output includes notification of a warning, reduction of a vehicle speed, stoppage of the vehicle body, and alteration of a travel direction. In particular, when the work vehicle is unmanned-operated with automatic steering or no-driver operated (a supervisor who does not operate the work vehicle but supervises an operation is present in a cabin), issuing a warning is important because precise steering maneuvers while taking into account an inclination are difficult. To solve this problem, an advantageous exemplary embodiment of the present invention is configured so that the circuitry outputs, as the travel limit information, a travel warning signal to warn of travelling and driving with automatic steering, when the vehicle body inclination angle exceeds a warning threshold. On the other hand, since travelling with automatic steering or travelling with manual steering at a low speed is still possible when a vehicle body inclination angle is relatively gentle, a measure of reducing the vehicle speed or switching an operation mode from automatic to manual may be selected if travelling with un-manned driving is warned. With manual steering, the driver may obviously be urged to drive the work vehicle carefully through such a warning.

In another advantageous exemplary embodiment, the circuitry outputs, as the travel limit information, an automatic steering prohibition signal to control the work vehicle operated with automatic steering to stop when the vehicle body inclination angle exceeds an automatic steering travel prohibition threshold. In this configuration, the vehicle body first comes to a halt when a vehicle body inclination angle exceeds the automatic steering travel prohibition threshold while the work vehicle is travelling with automatic steering. While the vehicle body is standstill, the driver can carefully select a measure such as lowering a vehicle speed or switching the operation from automatic to manual.

In a case where the vehicle body suddenly inclines, the vehicle body should obviously be stopped promptly regardless of whether the work vehicle is operated in either the automatic travel (automatic steering) mode or the manual travel (manual steering) mode. To this end, in the advantageous exemplary embodiment of the present invention, the circuitry outputs, as the travel limit information, a stop signal to control the work vehicle to stop when the vehicle body inclination angle exceeds a travel prohibition threshold.

By comparing a travel route set beforehand for allowing the work vehicle to travel with an own position calculated from positioning data obtained using a satellite positioning system such as GPS and GNSS, obtaining a deviation, and allowing the vehicle body to travel so that the deviation is reduced, a planned work and travel operation can be achieved. Such a work and travel operation can be possible in either manual steering or automatic steering. However, with automatic steering, controlling the work vehicle to keep travelling along a travel route while taking into account an inclination of the vehicle body is sometimes difficult. In addition, an inclined area in a work field remains unchanged unless the work field is improved. In such a situation, an inclined area where the work vehicle operated with automatic steering is prohibited to travel can be recorded such that only the work vehicle operated with manual steering is allowed to travel in the area. This feature allows an appropriate selection of a specification of a work vehicle to be loaded and a skill level of a driver to be assigned, in planning a work and travel operation on a travel route including such an inclined area where only the work vehicle operated with manual steering is allowed to travel. To this end, another advantageous exemplary embodiment of the present invention is configured such that the inclined area which has been recorded is read when a travel route is generated in planning a next operation.

A control method adopted in the above described work vehicle, regarding a detection of an inclination of the vehicle body and recording of a result of the detection can be configured using a computer system. A slope travel control system that is such a computer system is also included in an embodiment of the present invention. A slope travel control system according to an embodiment of the present invention is configured for a work vehicle to travel along a travel route in a work field including an inclination sensor and circuitry. The inclination sensor is to detect a vehicle body inclination angle of a vehicle body of the work vehicle with respect to a horizontal line. The circuitry is configured to calculate a position of the work vehicle in the work field based on positioning data. The circuitry is configured to receive the vehicle body inclination angle associated with the position. The circuitry is configured to output travel limit information at an inclination position on the travel route where the vehicle body inclination angle detected by the inclination sensor exceeds a threshold angle. The circuitry is configured to record, as an inclined area, an area around the inclination position which is calculated based on the positioning data. The slope travel control system can achieve effects described as features of the above described work vehicle, and include the above described various advantageous exemplary embodiments.

Obviously, numerous modifications and variations of the present invention are possible in light of the above teachings. It is therefore to be understood that within the scope of the appended claims, the invention may be practiced otherwise than as specifically described herein.

What is claimed is:

1. A work vehicle comprising:
    a vehicle body;
    an inclination sensor provided on the vehicle body to detect a vehicle body inclination angle with respect to a horizontal line;
    a calculator to calculate a position of the work vehicle in a work field based on positioning data;
    a travel route memory to store a travel route comprising travel route segments along which the work vehicle travels, the travel route comprising cycles, each of the cycles comprising a first straight travel route segment, a first U-turn travel route segment, a second straight travel route segment, and a second U-turn travel route segment as the travel route segments, the first straight travel route segment extending in a straight direction and having a first end and a second end opposite to the first end in the straight direction, the first U-turn travel route segment being connected to the second end, the work vehicle being configured to turn along the first U-turn travel route segment in one of a clockwise direction and a counterclockwise direction, the second straight travel route segment being connected to the first U-turn travel route segment and extending substantially parallel to the first straight travel route segment, the second straight travel route segment having a third end connected to the first U-turn travel route segment and a fourth end opposite to the third end in the straight direction, the second U-turn travel route segment being connected to the fourth end, the work vehicle being configured to turn along the second U-turn travel route segment in another of the clockwise direction and the counterclockwise direction to be connected to the first end of the first straight travel route segment in another of the cycles that is subsequent to each of the cycles;
    an information generator to output travel limit information at each inclination position along the travel route where the vehicle body inclination angle detected by the inclination sensor exceeds a threshold angle, the travel limit information including a stop signal to control the work vehicle to stop; and
    a recorder to record each inclination position along the travel route and each corresponding travel route segment among the travel route segments which includes the corresponding inclination position.

2. The work vehicle according to claim 1, wherein the information generator outputs a travel warning signal to warn of travelling with automatic steering when the vehicle body inclination angle exceeds a warning threshold angle that is below a travel prohibition threshold angle at which the stop signal is generated.

3. The work vehicle according to claim 1,
    wherein the inclination position which has been recorded is read when a travel route is generated in planning a next operation.

4. A slope travel control system for a work vehicle comprising:
    an inclination sensor to detect a vehicle body inclination angle of a vehicle body of the work vehicle with respect to a horizontal line;
    a calculator to calculate a position of the work vehicle in the work field based on positioning data;
    a travel route memory to store a travel route including travel route segments along which the work vehicle travels, the travel route comprising cycles, the cycles comprising a first straight travel route segment, a first U-turn travel route segment, a second straight travel route segment, and a second U-turn travel route segment as the travel route segments, the first straight travel route segment extending in a straight direction and having a first end and a second end opposite to the first end in the straight direction, the first U-turn travel route segment being connected to the second end, the work vehicle being configured to turn along the first U-turn travel route segment in one of a clockwise direction and a counterclockwise direction, the second straight travel route segment being connected to the first U-turn travel route segment and extending substantially parallel to the first straight travel route segment, the second straight travel route segment having a third end connected to the first U-turn travel route segment and a fourth end opposite to the third end in the straight direction, the second U-turn travel route segment being connected to the fourth end, the work vehicle being configured to turn along the second U-turn travel route segment in another of the clockwise direction and the counterclockwise direction to be connected to the first end of the first straight travel route segment in another of the cycles that is subsequent to each of the cycles;
    a receiver to receive the vehicle body inclination angle associated with the position;
    an information generator to output travel limit information at each inclination position along the travel route where the vehicle body inclination angle detected by the inclination sensor exceeds a threshold angle, the travel limit information including a stop signal to control the work vehicle to stop; and
    a recorder to record each inclination position along the travel route and each corresponding travel route segment among the travel route segments which includes the corresponding inclination position.

5. A slope travel control method comprising:
    generating a travel route including travel route segments along which the work vehicle travels, the travel route comprising cycles, each of the cycles comprising a first straight travel route segment, a first U-turn travel route segment, a second straight travel route segment, and a second U-turn travel route segment as the travel route segments, the first straight travel route segment extending in a straight direction and having a first end and a second end opposite to the first end in the straight direction, the first U-turn travel route segment being connected to the second end, the work vehicle being configured to turn along the first U-turn travel route segment in one of a clockwise direction and a counterclockwise direction, the second straight travel route segment being connected to the first U-turn travel route segment and extending substantially parallel to the first straight travel route segment, the second straight travel route segment having a third end connected to the first U-turn travel route segment and a fourth end opposite to the third end in the straight direction, the second U-turn travel route segment being connected to the fourth end, the work vehicle being configured to turn along the second U-turn travel route segment in another of the clockwise direction and the counterclockwise direction to be connected to the first end of the first straight travel route segment in another of the cycles that is subsequent to each of the cycles;

detecting a vehicle body inclination angle of a vehicle body of the work vehicle with respect to a horizontal line;

calculating a position of the work vehicle in the work field based on positioning data;

receiving the vehicle body inclination angle associated with the position;

outputting travel limit information at each inclination position along the travel route where the vehicle body inclination angle exceeds a threshold angle, the travel limit information including a stop signal to control the work vehicle to stop; and recording each inclination position along the travel route and each corresponding travel route segment among the travel route segments which includes the corresponding inclination position.

6. The work vehicle according to claim 1, wherein the information generator is configured to output the travel limit information to stop the work vehicle from automatically travelling.

7. The work vehicle according to claim 6, wherein the information generator is configured to output an automatic steering prohibition signal to prohibit automatic steering of the work vehicle when the vehicle body inclination angle exceeds an automatic steering travel prohibition threshold angle that is less than a travel prohibition threshold angle at which the stop signal is generated.

8. The work vehicle according to claim 1,
wherein the recorder is configured to further record an adjacent inclination position in a peripheral area around the inclination position and a travel route segment among the travel route segments which includes the adjacent inclination position.

9. The slope travel control system according to claim 4, wherein the information generator is configured to output the travel limit information to stop the work vehicle from automatically travelling.

10. The slope travel control system according to claim 9, wherein the information generator is configured to output an automatic steering prohibition signal to prohibit automatic steering of the work vehicle when the vehicle body inclination angle exceeds an automatic steering travel prohibition threshold angle that is less than a travel prohibition threshold angle at which the stop signal is generated.

11. The slope travel control system according to claim 4, wherein the recorder is configured to further record an adjacent inclination position in a peripheral area around the inclination position and a travel route segment among the travel route segments which includes the adjacent inclination position.

12. The slope travel control method according to claim 5, wherein the travel limit information is output to stop the work vehicle from automatically travelling.

13. The slope travel control method according to claim 12, wherein an automatic steering prohibition signal is output to prohibit automatic steering of the work vehicle when the vehicle body inclination angle exceeds an automatic steering travel prohibition threshold angle that is less than a travel prohibition threshold angle at which the stop signal is generated.

14. The slope travel control method according to claim 5,
wherein an adjacent inclination position in a peripheral area around the inclination position and a travel route segment among the travel route segments which includes the adjacent inclination position are further recorded.

15. A work vehicle comprising:
a vehicle body;
an inclination sensor provided on the vehicle body to detect a vehicle body inclination angle with respect to a horizontal line; and
a travel route memory to store a travel route including travel route segments along which the work vehicle travels, the travel route comprising cycles, each of the cycles comprising a first straight travel route segment, a first U-turn travel route segment, a second straight travel route segment, and a second U-turn travel route segment as the travel route segments, the first straight travel route segment extending in a straight direction and having a first end and a second end opposite to the first end in the straight direction, the first U-turn travel route segment being connected to the second end, the work vehicle being configured to turn along the first U-turn travel route segment in one of a clockwise direction and a counterclockwise direction, the second straight travel route segment being connected to the first U-turn travel route segment and extending substantially parallel to the first straight travel route segment, the second straight travel route segment having a third end connected to the first U-turn travel route segment and a fourth end opposite to the third end in the straight direction, the second U-turn travel route segment being connected to the fourth end, the work vehicle being configured to turn along the second U-turn travel route segment in another of the clockwise direction and the counterclockwise direction to be connected to the first end of the first straight travel route segment in another of the cycles that is subsequent to each of the cycles;
circuitry configured to
calculate a position of the work vehicle in a work field based on positioning data;
output travel limit information at each inclination position along the travel route where the vehicle body inclination angle detected by the inclination sensor exceeds a threshold angle, the travel limit information including a stop signal to control the work vehicle to stop; and record each inclination position along the travel route and each corresponding travel route segment among the travel route segments which includes the corresponding inclination position.

16. The work vehicle according to claim 15, wherein the circuitry is configured to output the travel limit information to stop the work vehicle from automatically travelling.

17. The work vehicle according to claim 16, wherein the circuitry is configured to output an automatic steering prohibition signal to prohibit automatic steering of the work vehicle when the vehicle body inclination angle exceeds an automatic steering travel prohibition threshold angle that is less than a travel prohibition threshold angle at which the stop signal is generated.

18. The work vehicle according to claim 15,
wherein the circuitry is configured to further record an adjacent inclination position in a peripheral area around the inclination position and a travel route segment among the travel route segments which includes the adjacent inclination position.

19. The work vehicle according to claim 1,
wherein a turning radius of the first U-turn travel route segment is substantially equal to a turning radius of the second U-turn travel route segment.

20. The slope travel control system according to claim 4,
wherein a turning radius of the first U-turn travel route segment is substantially equal to a turning radius of the second U-turn travel route segment.

21. The slope travel control method according to claim 5,
wherein a turning radius of the first U-turn travel route segment is substantially equal to a turning radius of the second U-turn travel route segment.

22. The slope travel control method according to claim 15,
wherein a turning radius of the first U-turn travel route segment is substantially equal to a turning radius of the second U-turn travel route segment.

* * * * *